United States Patent [19]

Baumann

[11] Patent Number: 5,421,546
[45] Date of Patent: Jun. 6, 1995

[54] ECCENTRICALLY DISPLACEABLE SLEEVE TYPE CONTROL VALVE

[76] Inventor: Hans D. Baumann, 32 Pine St., Rye, N.H. 03870

[21] Appl. No.: 272,841

[22] Filed: Jun. 10, 1994

[51] Int. Cl.[6] .................... F16K 31/126; F16K 31/524
[52] U.S. Cl. .......................................... 251/58; 74/57; 251/257; 251/331
[58] Field of Search .................. 251/5, 6, 7, 58, 61.1, 251/61.2, 229, 251, 257, 258, 259, 331; 74/55, 56, 57

[56] References Cited

U.S. PATENT DOCUMENTS

| | | | |
|---|---|---|---|
| 131,556 | 9/1872 | O'Donnell | 251/229 |
| 734,351 | 7/1903 | McKeown | 251/229 |
| 992,375 | 5/1911 | Moffitt | 251/229 |
| 1,048,825 | 12/1912 | Griffiths | 251/245 |
| 1,055,215 | 3/1913 | Ordner | 251/229 |
| 1,986,475 | 1/1935 | Hewitt | 251/331 |
| 2,534,577 | 12/1950 | Courtot | 251/258 |
| 2,660,395 | 11/1953 | Mair et al. | 251/7 |
| 2,667,324 | 1/1954 | Hansen | 251/6 |
| 2,812,154 | 11/1957 | Nordstrand | 251/251 |
| 2,928,421 | 3/1960 | Nordstrand | 251/331 |
| 2,948,504 | 8/1960 | Merrill | 251/331 |
| 2,961,006 | 11/1960 | Musser | 251/257 |
| 3,195,573 | 7/1965 | Daumy | 251/257 |
| 3,410,517 | 11/1968 | Wall | 251/6 |
| 3,433,454 | 3/1969 | Falkenblad et al. | 251/331 |
| 4,078,764 | 3/1978 | Haffner | 251/257 |
| 4,099,700 | 7/1978 | Young | 251/7 |
| 4,210,312 | 7/1980 | Hanson | 251/258 |
| 4,372,345 | 2/1983 | Mehus | 251/6 |
| 5,098,060 | 3/1992 | Mogler et al. | 251/7 |

*Primary Examiner*—George L. Walton

[57] ABSTRACT

A control valve comprised of a housing having a central, vertical bore retaining therein a flexible, tubular sleeve whose central portion can be eccentrically motivated towards or away from a valve seat with the aid of a ball pushed by a valve stem moving inside of the sleeve and having a slanted, camming groove, which is in contact with the ball, and where the valve seat is located perpendicularly towards and at the center of said vertical bore. The sleeve itself is retained within the housing by an upper and lower flanged plate.

4 Claims, 1 Drawing Sheet

ECCENTRICALLY DISPLACEABLE SLEEVE TYPE CONTROL VALVE

BACKGROUND OF THE INVENTION

This invention relates to packless control valves used to control and to block the flow of fluid in a piping conduit. A typical example of a packless valve used for this purpose is a diaphragm valve as illustrated, for example, in U.S. Pat. No. 4,014,514. These valves provide good closure means and are reasonably compact. However, since the diaphragm acts both as a closure member and a stem seal, these diaphragms have to be fairly large and are typically two to three times the diameter of the valve orifice. The result is a requirement for substantial actuating forces to overcome the forces created by the diaphragm area times fluid pressure. In case the diaphragm is made out of a plastic, such as PTFE (Polytetrafluoroethylene), routine repeated closure of such a diaphragm is not guaranteed due to the high mechanical stress imposed upon by the large flexible movement required for such a diaphragm. Another disadvantage of a diaphragm valve is their highly streamlined flow passage which can lead to cavitation and wear under high fluid velocities. Finally, the body size of a typical diaphragm valve is fairly large in comparison to the port opening which makes the construction of such a valve fairly expensive.

My invention overcomes these and other objections to valves of prior art by using a flexible tube as a closure element and stem sealing device. The flexible tube itself can be made from any commercial elastomeric or plastic, such as PTFE (Polytetrafluoroethylene) without imposing undue stresses on the material. The relatively small amount of radial displacement of the sealing material requires only moderate actuating forces which leads to substantial cost savings as far as actuating devices are concerned. In comparison to diaphragm valves, which have relatively large areas subject to fluid pressure and, therefore, high stresses, my flexible tube is supported over more than 90% of the exposed area by an interiorly placed mechanical element resulting again in relatively low stress levels, thereby guaranteeing a substantially higher number of life cycles. Another advantage lies in the fact that my sealing tube diameter is only about 65% larger than the valve port diameter, therefore, requiring a relatively small valve housing and valve closure flanges. Finally, my invention provides for a valve that can be utilized in full vacuum without fear of the sealing membrane collapsing under a negative pressure gradient as is the case with typical diaphragm valves. These and other important advantages will be explained more clearly by the following drawings and descriptions of my invention, which is a further improvement over my previous invention more closely described in U.S. Pat. No. 5,288,056.

DESCRIPTION OF THE INVENTION

While the invention will be described in connection with a preferred embodiment, it should be understood that there is no intention to limit the invention to this specific embodiment.

Figure 1:
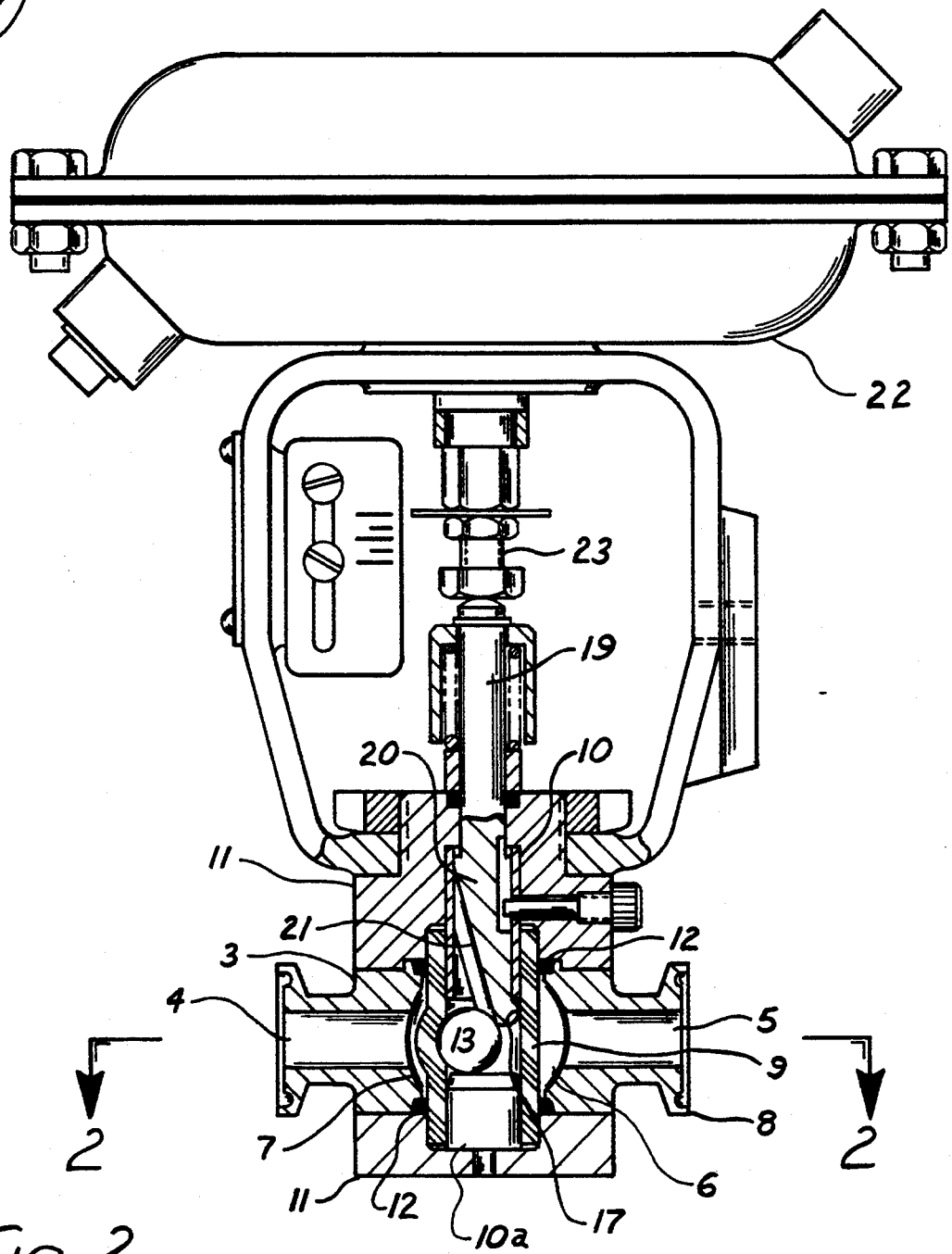
FIG. 1 is a vertical central, cross-sectional view of a preferred embodiment of my invention, where the valve is shown in the open position.

Referring to FIG. 1, my invention is comprised of the valve housing 3 having an inlet port 4 and an outlet port 5. It should be understood that in order to function properly, inlet ports 4 and 5 could easily be reversed and that the choice of location is purely one out of convenience. Valve housing 3 has a central, spherical, perpendicular bore 6 and where the intersection between inlet port 4 and circular bore 6 provides for a spherical sealing surface 7 constituting a valve seat. Inlet port 4 and outlet port 5 have a flanged structure 8 suitable to connect to a fluid containing piping system. Circular bore 6 contains within a flexible tube or sleeve 9 which fits into circular bore 6 and which is supported in the inside by a bushing 10 and an anvil 10a, the latter being held in place by an upper and lower bonnet flange 11. Suitable O-ring seals 12 prevent fluid from leaking past the sleeve and bonnet flange 11. The central interior of sleeve 9 is occupied by a ball-shaped element 13 which is supported by anvil 10a. Bushing 10, guides therein a valve stem 19 which has a thickened central portion 20 which has a tapered concave portion 21 configured to engage slidingly the ball-shaped element 13. The upper extension of stem 19 engages an actuating device 22 through a threaded push rod 23.

Figure 2:
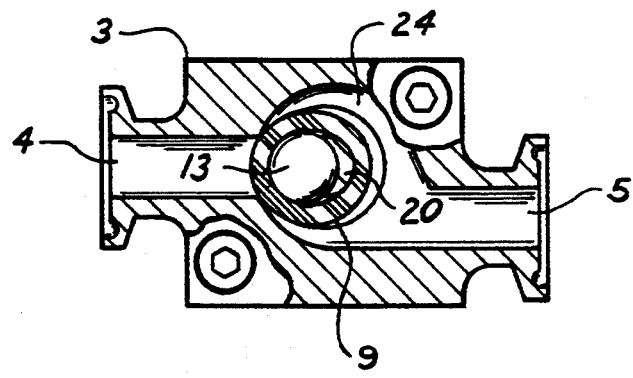
FIG. 2 is a horizontal, cross-sectional view of the device shown in FIG. 1 and following the line 2—2 in FIG. 1, and where the valve is shown in the closed position.

Referring specifically to FIG. 1, here we see tapered portion 21 (as part of stem 19) in the raised position, thereby allowing the ball-shaped element 13 to retract from inlet port 4. This in turn will lead to an eccentric, radial displacement of the flexible sleeve 9 away from sealing surface 7, which will allow fluid in inlet port 4 to flow between sealing surface 7 and flexible sleeve 9 into body cavity 24 and from there to outlet port 5. This is the open valve position. Upon actuation of the actuating device 22, valve stem 19 is forced down, which in turn forces ball-shaped element 13 to move towards the inlet port 4 and ultimately forcing flexible sleeve 9 to engage sealing surface 7 of housing 3 to accomplish a disruption of fluid flow from inlet port 4. This is also the position illustrated in FIG. 2. Since the flexible sleeve 9 may be made out of a corrosion resistant inert material such as PTFE (Polytetrafluoroethylene), which is a relatively stiff material, a full retraction of sleeve 9 from sealing surface 7 may not be possible. To overcome this problem, I have added an additional half-round collar 17 at the lower rim of stem 19. The collar 17 will forcefully retract flexible sleeve 9 by pushing out from the inside whenever stem 19 moves upward from the lower, valve closed position. As shown in FIG. 2, the outlet port 5 may be eccentrically offset from inlet port 4 in order to facilitate drainage from valve cavity 24.

Numerous modifications can be made to the invention without departing from the spirit of the following claims. For example, inlet bore 4 may have a reduced bore portion at the intersection with circular bore 6, thus providing for reduced flow capacity.

Having thus described a typical embodiment, I hereby claim the following features of my invention:

1. Eccentrically Displaceable Sleeve Type Control Valve, comprising a housing having at least one horizontal inlet port and outlet port and one central opening extending essentially perpendicular to said inlet port and having upper and lower terminating ends, the interface between said horizontal inlet port and the perpendicular central opening constituting a valve seat, a flexible sleeve having an inside wall portion inserted within and extending beyond the length of said central opening, a spherical core placed within said flexible sleeve and extending in diameter beyond the cross-sectional dimension of said inlet port, a shaft extending through the length of said central opening and within the inside wall portion of said sleeve and having a camming groove portion with a slanted surface at the one end thereof capable of sliding against said core in a wedging relationship along said camming groove portion in a first direction causing the lateral displacement of said core towards said inlet port thereby forcing the central portion of said flexible sleeve to make a complimentary motion and thereby causing the sleeve to contact the valve seat to close of and prevent fluid from flowing from the inlet to the outlet port upon sufficient longitudinal displacement of said shaft, and with the camming groove portion of said shaft moving along said core within said sleeve in a second direction causing said core and said camming groove portion to move into a non-wedging position thereby causing the lateral displacement of said core within said sleeve to move away from said inlet port and for moving said sleeve away from said valve seat and into an open position for allowing fluid to flow from the inlet port to the outlet port, suitable closure means attached to each terminating end of said central opening for retaining a portion of the flexible sleeve therein.

2. Eccentrically Displaceable Sleeve Type Control Valve of claim 1, wherein said camming element of the shaft is comprised of a thickened central portion of said shaft having a tapered concave groove.

3. Eccentrically Displaceable Sleeve Type Control Valve of claim 1, wherein said thickened portion of said stem furthermore has a semi-circular rim snugly fitting within said sleeve and capable of moving the latter into alignment with said central opening of said housing.

4. Eccentrically Displaceable Sleeve Type Control Valve of claim 1, wherein each of said closure means is comprised of a flange suitably attached to said valve housing and having a circular opening to snugly engage the upper or lower extremity of the flexible sleeve, and suitable seals mounted between said flange and said housing and configured to prevent fluid flow from said central opening past the exterior of said flexible sleeve and between the housing and said flange.

* * * * *